(12) United States Patent
Shen et al.

(10) Patent No.: US 11,978,270 B2
(45) Date of Patent: May 7, 2024

(54) AI-ASSISTED AUTOMATIC LABELING SYSTEM AND METHOD

(71) Applicant: V5MED INC., Zhubei (TW)

(72) Inventors: Tzu-Kuei Shen, Hsinchu (TW); Chien Ting Yang, Hsinchu (TW); Guang-Hao Suen, Hsinchu (TW); Linda Siana, Hsinchu (TW); Liang-Wei Sheu, Hsinchu (TW)

(73) Assignee: V5med Inc., Zhubei (TW)

( * ) Notice: Subject to any disclaimer, the term of this patent is extended or adjusted under 35 U.S.C. 154(b) by 398 days.

(21) Appl. No.: 17/550,427

(22) Filed: Dec. 14, 2021

(65) Prior Publication Data

US 2023/0154216 A1 May 18, 2023

(30) Foreign Application Priority Data

Nov. 18, 2021 (TW) .................. 110142875

(51) Int. Cl.
*G06V 20/70* (2022.01)
*G06N 20/00* (2019.01)
(Continued)

(52) U.S. Cl.
CPC ............. *G06V 20/70* (2022.01); *G06N 20/00* (2019.01); *G06V 10/26* (2022.01); *G06V 10/776* (2022.01); *G06V 20/695* (2022.01)

(58) Field of Classification Search
CPC ...... G06V 20/70; G06V 10/26; G06V 10/776; G06V 20/695; G06V 10/774; G06V 20/69;
(Continued)

(56) References Cited

U.S. PATENT DOCUMENTS 10,445,879 B1 10/2019 Fuchs et al.
2020/0357506 A1 11/2020 Liao et al.
(Continued)

FOREIGN PATENT DOCUMENTS

CN 102165489 B 11/2015
CN 105264358 A 1/2016
(Continued)

OTHER PUBLICATIONS

Search Report Issued By Foreign Patent Office in Application No. 110142875/11120923950.

*Primary Examiner* — Bobbak Safaipour
(74) *Attorney, Agent, or Firm* — Rosenberg, Klein & Lee

(57) ABSTRACT

An AI-assisted automatic labeling system and a method thereof are disclosed. The method comprises steps: selecting images from microscopic images as candidate images, using a pre-labeling module to automatically label cells in the candidate images, and dividing the labeled images into training data and verification data; using a training module and the training data to train a basic model; using a verification module to verify and modify the basic model, wherein the verification module respectively verifies at least one cell area and at least one background area of the verification data to converge the basic model and form an automatic labeling model; using the automatic labeling model to automatically label cells in redundant images of the microscopic images. The basic model trained by the present invention can use few labeled images to perform regressive training and verification and then automatically labels the redundant images accurately and efficiently.

16 Claims, 3 Drawing Sheets

(51) Int. Cl.
*G06V 10/26* (2022.01)
*G06V 10/776* (2022.01)
*G06V 20/69* (2022.01)

(58) Field of Classification Search
CPC .... G06V 10/764; G06V 20/698; G06N 20/00; G06F 18/214
See application file for complete search history.

(56) References Cited

U.S. PATENT DOCUMENTS

| | | | | |
|---|---|---|---|---|
| 2021/0256252 | A1 | 8/2021 | Tsutsumi | |
| 2021/0272288 | A1 | 9/2021 | Takahashi et al. | |
| 2021/0275123 | A1 | 9/2021 | Lin et al. | |
| 2021/0357808 | A1* | 11/2021 | Tsuyuki | G06F 18/22 |
| 2022/0392239 | A1* | 12/2022 | Li | G06V 20/70 |
| 2023/0153965 | A1* | 5/2023 | Bai | G06V 10/82 |
| | | | | 382/254 |

FOREIGN PATENT DOCUMENTS

| | | |
|---|---|---|
| CN | 108596046 A | 9/2018 |
| CN | 107103601 B | 4/2020 |
| CN | 111221118 A | 6/2020 |
| CN | 107330263 B | 7/2020 |
| CN | 113034429 A | 6/2021 |
| CN | 111551117 B | 7/2021 |
| CN | 113222887 A | 8/2021 |
| IN | 109102018 B | 11/2019 |
| JP | 2021018766 A | 2/2021 |
| JP | 6933164 B2 | 9/2021 |
| TW | 202014202 A | 4/2020 |
| TW | I715877 B | 1/2021 |
| TW | 202115675 A | 4/2021 |
| TW | I731397 B | 6/2021 |
| TW | 202131352 A | 8/2021 |

* cited by examiner

AI-ASSISTED AUTOMATIC LABELING SYSTEM AND METHOD

This application claims priority of Application No. 110142875 filed in Taiwan on 18 Nov. 2021 under 35 U.S.C. § 119; the entire contents of all of which are hereby incorporated by reference.

BACKGROUND OF THE INVENTION

Field of the Invention

The present invention relates to an image processing technology, particularly to an AI-assisted automatic labeling system and method.

Description of the Prior Art

Cell labeling is to label some specific cells in a multicellular system so as to investigate the function and behavior of these specific cells. In operation of cell labeling, the sample is placed under a microscope, and the images thereof are captured at a high magnification power; the images are displayed on a computer, and the required cells are marked.

In the biopsy or cytological sample for cytotaxonomy, such as the sample for cancer cytotaxonomy, it is truly intense hard labor for the operator to manually label cells among thousands or tens of thousands of cells. Especially, the cellular labeling is highly dependent on professional medical knowledge. Therefore, the outputs of cellular labeling are hard to achieve uniformity. Only labeling cells in a single image is very time-consuming, not to mention labeling cells in images captured from a slide glass, which may amount to 900-1600 pieces of images, depending on the size of the sample on the slide glass. Therefore, labeling cells in numerous pieces of images not only consume much manpower and time but also impair ocular health. Further, mass-cellular labeling is hard to achieve sufficient accuracy.

Accordingly, the present invention proposes an AI-assisted automatic labeling system and method to solve the abovementioned problems and meet future requirement. The principle and embodiments thereof will be described in detail below.

SUMMARY OF THE INVENTION

The primary objective of the present invention is to provide an AI-assisted automatic labeling system and a method thereof, wherein the images labeled beforehand are used to train a basic model for automatic labelling; verifications are used to converge the basic model; the basic model is used for automatic cyto-labeling, whereby to overcome the problems of low accuracy and low efficiency of manual labeling.

Another objective of the present invention is to provide an AI-assisted automatic labeling system and a method thereof, wherein the portions of the verification data, which are ascertained to have cells, are verified to increase the accuracy rate of labeling; next, the portions of the verification data, which are ascertained to have no cell, are verified also to reduce the misjudgment rate of labeling, whereby to increase the accuracy of the basic model.

Another objective of the present invention is to provide an AI-assisted automatic labeling system and a method thereof, wherein similarity scores are respectively assigned to the labeled cells for determining the accuracy rate of the labeling results, whereby to determine whether the labeled images are directly output or the basic model needs to be retrained by more training data.

In order to achieve the abovementioned objectives, the present invention provides an AI-assisted automatic labeling system, which comprises a pre-labeling module, configured to selects images from a plurality of microscopic images as candidate images and allocates the rest of the microscopic images as redundant images, and which automatically labels a plurality of cells in the candidate images, and which divides the plurality of images where cells have been labeled into a plurality of pieces of training data and a plurality of pieces of verification data; at least one first database, connected with the pre-labeling module for storing the training data and the verification data; a training module, connected with the first database and configured to train a basic model with the training data; a verification module, connected with the first database and the training module to acquire the basic model and configured to verify and modify the basic model with the verification data, wherein the verification module respectively verifies at least one cell area and at least one background area in the verification data to converge the basic model to form an automatic labeling model; and an automatic labeling module, which is connected with the verification module and uses the automatic labeling model to automatically label cells in the redundant images.

In one embodiment, the pre-labeling module labels cells via using an image processing algorithm to find out the boundaries of the ells.

In one embodiment, the microscopic images are stored in a second database, and the second database is connected with the pre-labeling module and the automatic labeling module.

In one embodiment, the pre-labeling module generates at least one shielded area in the images where cells have been labeled, and the training module would not learn from the shielded areas when training the basic model.

In one embodiment, the verification module verified at a given number of training epoch during training of the basic model.

In one embodiment, the verification module verifies the verification data after the training of the basic model is completed.

In one embodiment, the automatic labeling module assigns similarity scores to each labeled cells to determine whether to output the images of the labeled cells directly or retrain the basic model.

The present invention further provides an AI-assisted automatic labeling method, which processing by a computer, comprises steps: selecting images from a plurality of microscopic images as candidate images, allocating the rest of the images as redundant images, and automatically labeling a plurality of cells in the candidate images; dividing the images where cells are labeled into a plurality of pieces of training data and a plurality of pieces of verification data; using the training data to train a basic model; using the verification data to verify and modify the basic model, and respectively verifying at least one cell area and at least one background area in the verification data to converge the basic model to form an automatic labeling model; and using the automatic labeling model to automatically label cells in the redundant images.

In one embodiment, the step of using the verification data to verify and modify the basic model further comprises steps: using the basic model to verify the cell area of one of the plurality of pieces of verification data to determine a first model score; if the first model score is lower than a first preset value, adding the piece of verification data to the training data and retraining the basic model; using the basic model to verify the background area of one of the plurality of pieces of verification data to determine a second model score; if the second model score is lower than a second preset value, adding the piece of verification data to the training data and retraining the basic model; if the first model score is higher than the first preset value and the second model score is higher than the second preset value, passing the verification.

In one embodiment, if the first model score is lower than the first preset value, the verification data is added to the training data, and the background area of the verification data is shielded.

In one embodiment, if the second model score is lower than the second preset value, the verification data is added to the training data, and the cell area of the verification data is shielded.

DETAILED DESCRIPTION OF THE INVENTION

The present invention provides an AI-assisted automatic labeling system and a method thereof, which use fewer pieces of labeled training data to train a basic model and then use labeled verification data to verify and modify the basic model and generate an automatic labeling model, whereby new microscopic images can be labeled automatically, wherefore the users are exempted from the difficult manual labeling operation, time is saved, and accuracy is increased.

Figure 1:
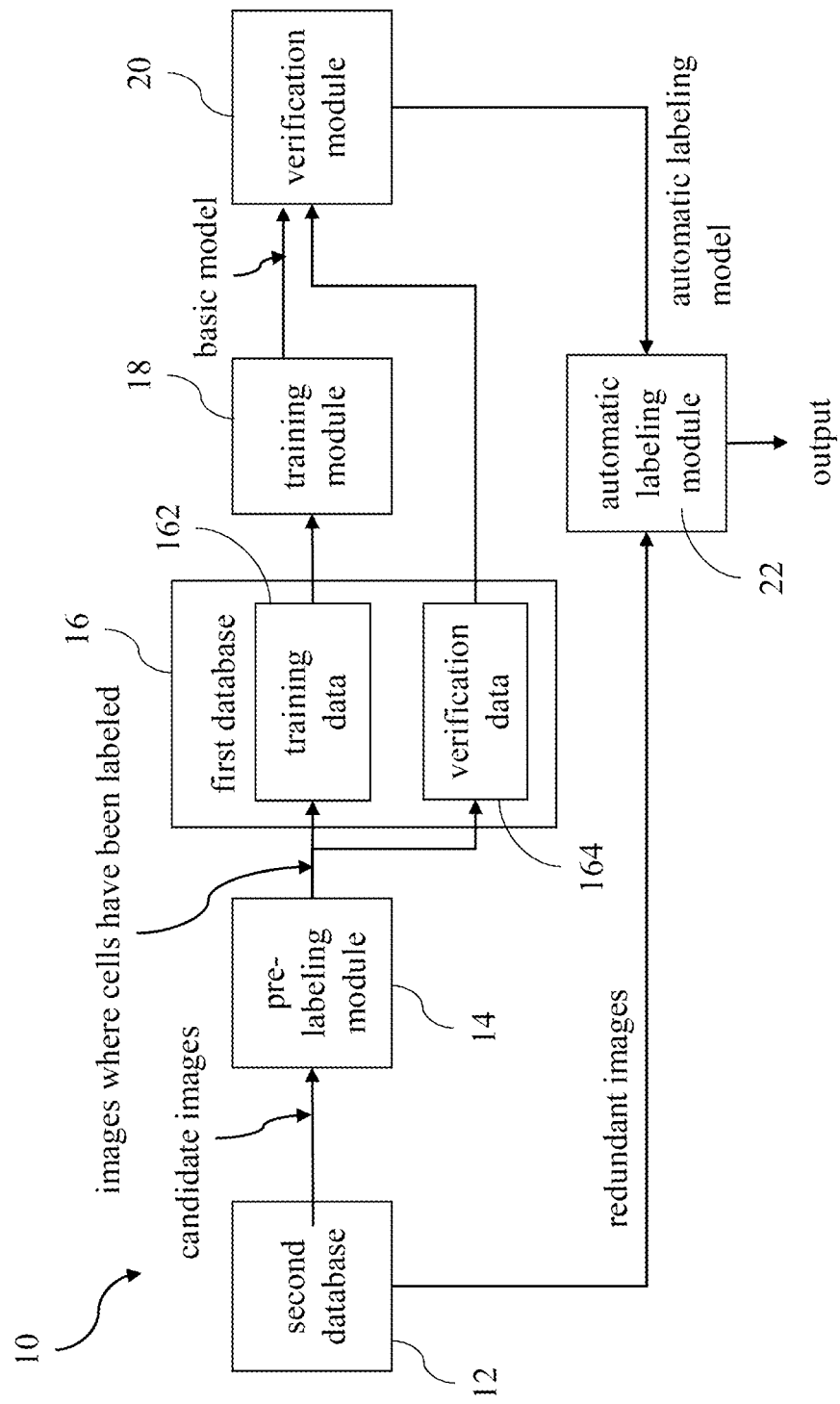
FIG. 1 is a block diagram of an AI-assisted automatic labeling system of the present invention.

Refer to FIG. 1, which is a block diagram of an AI-assisted automatic labeling system of the present invention. The AI-assisted automatic labeling system 10 of the present invention set in a computer comprises a second database 12, a pre-labeling module 14, a first database 16, a training module 18, a verification module 20, and an automatic labeling module 22. The pre-labeling module 14 is connected with the second database 12 and the first database 16. The first database 16 is further connected with the training module 18. The verification module 20 is connected with the first database 16, the training module 18 and the automatic labeling module 22. The automatic labeling module 22 is further connected with the second database 12.

After a microscope shoots a sample on a microslide and obtains 100-2000 pieces of microscopic images, the microscopic images are stored in the second database 12. The pre-labeling module 14 is used to select a portion of the microscopic images as candidate images. The rest of the microscopic images are allocated as redundant images. The pre-labeling module 14 automatically labels a plurality of cells in the candidate images and divides the plurality of images where cells are labeled into a plurality of pieces of training data 162 and a plurality of pieces of verification data 164. Then, the pre-labeling module 14 stores the training data 162 and the verification data 164 in the first database 16. The first database 16 may include two databases storing the training data 162 and the verification data 164, respectively. Alternatively, the training data 162 and the verification data 164 are stored in an identical first database 16. The training module 18 includes an artificial intelligence (AI) model and uses the training data 162 to train the AI model into a basic model. The verification module 20 uses the verification data to verify the basic model, wherein the verification module 20 respectively verifies at least one cell area and at least one background area of the verification data to modify and convergence the basic model to form an automatic labeling model. After the training of the automatic labeling model is completed, the automatic labeling model will be stored in the automatic labeling module 22. The redundant images in the second database 12 and other new microscopic images are directly transmitted to the automatic labeling module 22. The automatic labeling module 22 performs automatic cellular labeling to the redundant images and new microscopic images.

Figure 2:
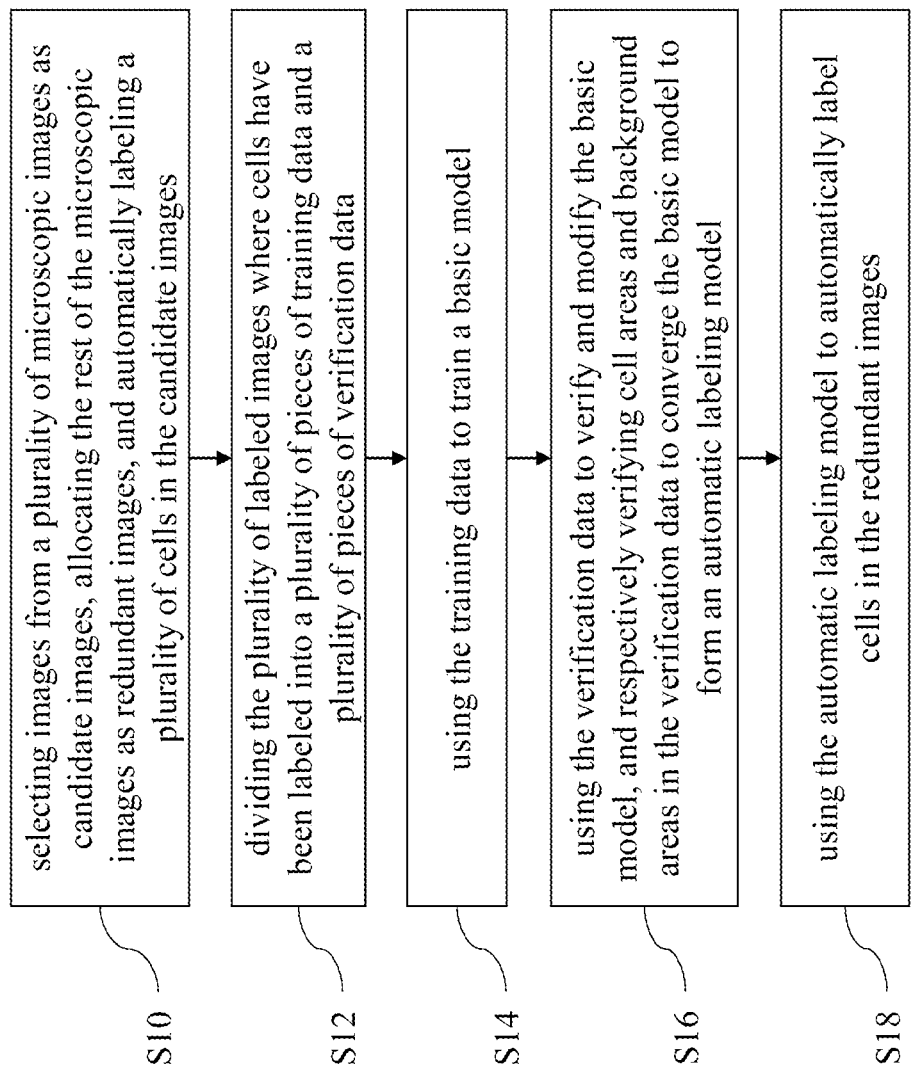
FIG. 2 is a flowchart of an AI-assisted automatic labeling method of the present invention.

Refer to FIG. 2, which is a flowchart of an AI-assisted automatic labeling method of the present invention. In Step S10, the pre-labeling module 14 selects a portion of a plurality of microscopic images as candidate images and allocates the rest of the microscopic images as redundant images; the pre-labeling module 14 automatically labels a plurality of cells in the candidate images. In Step S12, the pre-labeling module 14 divides the plurality of images where cells are labeled into a plurality of pieces of training data and a plurality of pieces of verification data and stores the training data and the verification data in the first database 16. In Step S14, the training module 18 acquires the training data from the first database 16 and uses the training data to train a basic model. In Step S16, the verification module 20 uses the verification data to verify and modify the basic model, wherein the verification of the verification module 20 includes a step of respectively verifying at least one cell area and at least one background area of the verification data to modify and convergence the basic model to form an automatic labeling model. In Step S18, after the automatic labeling model is stored in the automatic labeling module 22, the automatic labeling module 22 performs automatic cellular labeling to the redundant images. Besides, new microscopic images may also be directly input to the automatic labeling module 22 and automatically labeled by the automatic labeling module 22.

In Step S10, an image processing algorithm may be used to find out the boundaries of cells in the candidate images; alternatively, the physician may select the cell areas in advance, and then the image processing algorithm is used to label the cells in the cell areas. The cell areas are regions where cells certainly exist. The unselected areas include background areas and shielded areas. While training the basic model, the training module 18 does not learn from the shielded areas. However, the background areas are to be used in verification. Therefore, each candidate image is divided into three portions: the cell areas, the background areas, and the shielded areas.

Figure 3:
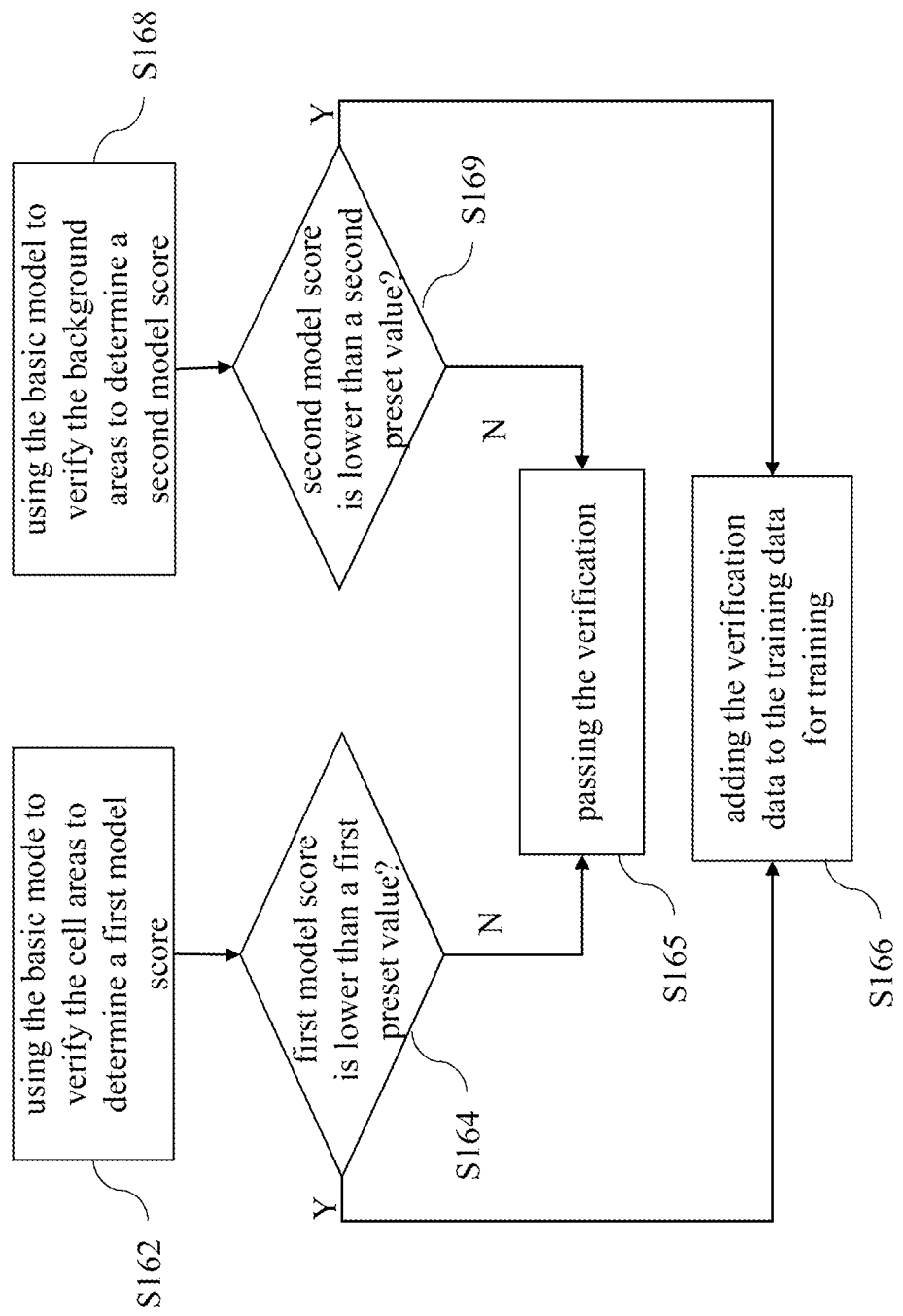
FIG. 3 is a detailed flowchart of a verification step of an AI-assisted automatic labeling method of the present invention.

Refer to FIG. 3, which is a detailed flowchart of a verification step of an AI-assisted automatic labeling method of the present invention. Step S16 further comprises the following steps. After the verification data 164 is input to the verification module 20, the verification module 20 will respectively verify the cell areas and the background areas of the verification data. Firstly, in Step S162, the basic model is used to verify the cell areas to determine a first model score, which represents the accuracy rate of labeling. The more the cells that are not labeled by the basic model or the more the cells that are incorrectly labeled, the lower the first model score is. In Step S164, the system determines whether the first model score is lower than a first preset value; if yes, the first model score is regarded as too low. Thus, the process proceeds to Step S166. In Step S166, the piece of verification data is added to the training data to compel the basic model to learn the cell areas of the piece of verification data; the other areas of the piece of verification data (including the background areas and the shielded areas) are shielded. If the first model score is higher than the first preset value, the process proceeds to Step S165. In Step S165, the verification is passed. After the verification of the cell areas is completed, the accuracy rate of labeling is upgraded. In Step S168, the basic model is used to verify the background areas to determine a second model score. Step S168 is to lower the misjudgment rate. The second model score represents the misjudgment rate of the basic model. If the basic model labels an area that should not be labeled, the second model score will be lower than a second present value. Thus, the process proceeds to Step S166. In Step S166, the piece of verification data is added to the training data to compel the basic model to learn the non-cell areas of the piece of verification data, i.e., the background areas; the other areas of the piece of verification data (including the cell areas and the shielded areas) are shielded. If the second model score is higher than the second preset value, the process proceeds to Step S165. In Step S165, the verification is passed.

The steps shown in FIG. 3 will be undertaken repeatedly until the basic model is trained to convergence and form an automatic labeling model. During the training stage of the basic model, two adjacent cycles of the verifications of the verification module 20 may be verified at a given number of training epoch. For example, every 5 epoch of the basic model is trained, the verification module 20 verified once. Alternatively, the verification module 20 does not perform verification until the training of the basic model is completed.

After the training of the automatic labeling model is completed and the unlabeled redundant images and new microscopic images are input to the AI-assisted automatic labeling system 10, the automatic labeling module 22 automatically performs labeling and assigns a similarity score to each labeled cell, whereby to determine whether the labeled cell is output directly or the basic model needs re-training. For example, if the labeled cell has a high similarity score, it means that the objects labeled in the training data are cells exactly. In such a case, the results of the automatic labeling will have high similarity scores as expected, and the labeled images may be directly output to the physicians for diagnosis. If the labeled cell has a low similarity score, it means that the size of the training data is too small or that the images labeled at present include many items that the automatic labeling model does not learn. Although the automatic labeling model has basic labeling ability, the labeling thereof is not sufficiently accurate. Thus, it is required to use an image processing algorithm to automatically label cell areas. Then, the redundant images and new microscopic images are used as training data to train the basic model so as to sophisticate the following automatic labeling model.

In conclusion, the present invention provides an AI-assisted automatic labeling system and a method thereof, which use an image processing algorithm to label candidate images in advance and classifies the labeled images into training data and verification data. The training data are used to train a basic model. The cell areas and the background areas of the verification data are used to verify and modify the basic model, whereby to increase the accuracy rate and decrease the misjudgment rate in labeling operations. After the basic model is converged to generate an automatic labeling model, the automatic labeling model can automatically label the unlabeled cell images and obtain similarity scores of the cells, whereby to determine one of the following actions: directly outputting the labeled images, re-training the basic model, and labeling cell areas by physicians. With the system and method of the present invention, few labeled images are sufficient to perform training and generate an automatic labeling model. Thereby, the present invention overcomes the problems of low efficiency and low accuracy of the conventional manual labeling technology.

The embodiments have been described above to demonstrate the principles of the present invention. However, these embodiments are only to exemplify the present invention but not to limit the scope of the present invention. Any modification or variation according to the spirit or characteristics of the present invention is to be also included by the scope of the present invention.

What is claimed is:

1. An artificial intelligence-assisted automatic labeling system, comprising:
   a pre-labeling module, configured to select images from a plurality of microscopic images as candidate images and allocates the rest of the microscopic images as redundant images, and which automatically labels a plurality of cells in the candidate images, and which divides the plurality of images where cells have been labeled into a plurality of pieces of training data and a plurality of pieces of verification data;
   at least one first database, connected with the pre-labeling module for storing the training data and the verification data;
   a training module, connected with the first database and configured to train a basic model with the training data;
   a verification module, connected with the first database and the training module to acquire the basic model and configured to verify and modify the basic model with the verification data, wherein the verification module respectively verifies at least one cell area and at least one background area in the verification data to converge the basic model to form an automatic labeling model; and
   an automatic labeling module, which is connected with the verification module and uses the automatic labeling model to automatically label cells in the redundant images.

2. The artificial intelligence-assisted automatic labeling system according to claim 1, wherein the pre-labeling module labels cells via using an image processing algorithm to find out boundaries of the cells.

3. The artificial intelligence-assisted automatic labeling system according to claim 1, wherein the microscopic images are stored in a second database, and the second database is connected with the pre-labeling module and the automatic labeling module.

4. The artificial intelligence-assisted automatic labeling system according to claim 1, wherein the pre-labeling module generates at least one shielded area in the images where cells have been labeled, and the training module does not learn from the shielded areas when training the basic model.

5. The artificial intelligence-assisted automatic labeling system according to claim 1, wherein the verification module verified at a given number of training epochs during training of the basic model.

6. The artificial intelligence-assisted automatic labeling system according to claim 1, wherein the verification module verifies the verification data after training of the basic model is completed.

7. The artificial intelligence-assisted automatic labeling system according to claim 1, wherein the automatic labeling module assigns similarity scores to each labeled cells to determine whether to output the images of the labeled cells directly or retrain the basic model.

8. An artificial intelligence-assisted automatic labeling method, which processing by a computer, comprising steps:
   selecting images from a plurality of microscopic images as candidate images, allocating the rest of the microscopic images as redundant images, and automatically labeling a plurality of cells in the candidate images;
   dividing the images where cells are labeled into a plurality of pieces of training data and a plurality of pieces of verification data;
   using the training data to train a basic model;
   using the verification data to verify and modify the basic model, and respectively verifying at least one cell area and at least one background area in the verification data to converge the basic model to form an automatic labeling model; and
   using the automatic labeling model to automatically label cells in the redundant images.

9. The artificial intelligence-assisted automatic labeling method according to claim 8, wherein the step of automatically labeling the cells in the candidate images includes a step of using an image processing algorithm to find out boundaries of the cells.

10. The artificial intelligence-assisted automatic labeling method according to claim 8, wherein the images where cells have been labeled include at least one shielded area, and the training module does not learn from the shielded areas when training the basic model.

11. The artificial intelligence-assisted automatic labeling method according to claim 8, wherein verification data are verified at a given number of training epoch during training of the basic model.

12. The artificial intelligence-assisted automatic labeling method according to claim 8, wherein the verification data is verified after training of the basic model is completed.

13. The artificial intelligence-assisted automatic labeling method according to claim 8, wherein after the automatic labeling model automatically labels cells in the redundant images, the automatic labeling model assigns similarity scores to labeled cells to determine whether to output the images of the labeled cells directly or retrain the basic model.

14. The artificial intelligence-assisted automatic labeling method according to claim 8, wherein the step of using the verification data to verify and modify the basic model further comprises steps:
   using the basic model to verify the at least one cell area of one of the plurality of pieces of verification data to determine a first model score;
   if the first model score is lower than a first preset value, adding the piece of verification data to the training data and retraining the basic model;
   using the basic model to verify the at least one background area of one of the plurality of pieces of verification data to determine a second model score;
   if the second model score is lower than a second preset value, adding the piece of verification data to the training data and retraining the basic model; and
   if the first model score is higher than the first preset value and the second model score is higher than the second preset value, passing the verification.

15. The artificial intelligence-assisted automatic labeling method according to claim 14, wherein if the first model score is lower than the first preset value, the piece of verification data is added to the training data, and the at least one background area of the piece of verification data is shielded.

16. The artificial intelligence-assisted automatic labeling method according to claim 14, wherein if the second model score is lower than the second preset value, the piece of verification data is added to the training data, and the at least one cell area of the verification data is shielded.

* * * * *